United States Patent

Moller et al.

[15] 3,694,510
[45] Sept. 26, 1972

[54] ALAPHATIC POLYAMINOETHER COMPOUNDS

[72] Inventors: Friedrich Moller; Gunter Hauptmann, both of Leverkusen, Germany; Heinz-Wolfgang Patzelt, Carnegie, Pa.

[73] Assignee: Farbenfabriken Bayer Aktiengesellschaft, Leverkusen, Germany

[22] Filed: Oct. 20, 1969

[21] Appl. No.: 867,901

[30] Foreign Application Priority Data

Oct. 28, 1968 Germany..........P 18 04 361.3

[52] U.S. Cl.........260/584 C, 260/2.5 AC, 260/75 T, 260/75 NC, 260/465.5 R, 260/583 G, 260/584 R

[51] Int. Cl..............................................C07c 93/02

[58] Field of Search...................................260/584 C

[56] References Cited

UNITED STATES PATENTS

| | | | |
|---|---|---|---|
| 3,129,106 | 4/1964 | Katz | 260/584 X |
| 2,425,628 | 8/1947 | Loder et al. | 260/584 |
| 3,480,675 | 11/1969 | Poppelsdorf | 260/584 |

FOREIGN PATENTS OR APPLICATIONS

| | | | |
|---|---|---|---|
| 1,426,198 | 12/1965 | France | 260/584 |
| 1,030,558 | 5/1968 | Germany | 260/584 |
| 1,205,548 | 11/1965 | Germany | 260/584 |

OTHER PUBLICATIONS

Cazier et al., Chemical Abstracts, Vol. 43, 1949. 134 b.

Primary Examiner—Joseph Rebold
Assistant Examiner—C. F. Warren
Attorney—Robert A. Gerlach and George W. Rauchfuss

[57] ABSTRACT

Amino compounds having the formula

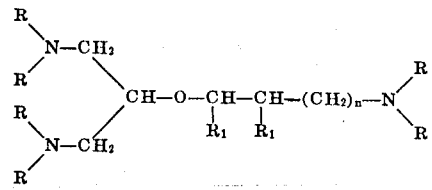

wherein n is 0 or 1 and the R substituents, which may be the same or different, represent methyl or ethyl radicals, the $R_1$ substituents representing hydrogen atoms or a hydrogen atom and a methyl, ethyl or

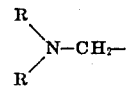

radical in cases where n is 0 but only hydrogen atoms in cases where n is 1 may be employed in the catalyzed polyurethane forming reaction between compounds containing hydrogen atoms reactive with —NCO groups and organic polyisocyanates.

4 Claims, No Drawings

ALAPHATIC POLYAMINOETHER COMPOUNDS

This invention relates to amine compounds useful as catalysts in a catalytic process for producing polyurethanes by the reaction of organic isocyanates with active hydrogen containing compounds. Additionally, this invention relates to a method of producing amine compounds useful as catalysts and to a catalytic process for producing polyurethanes by the reaction of organic isocyanates with active hydrogen containing compounds.

It has been heretofore known that synthetic resins which contain urethane groups, in particular, foam plastics which contain urethane groups, can be produced by reacting compounds which contain hydrogen atoms reactive with —NCO groups with polyisocyanates, optionally with the addition of water and/or other suitable blowing agents, catalysts and emulsifiers and other additives. The most important catalysts used, apart from organo-metallic compounds, are tertiary amines. Processes for the production of polyurethane resins, in particular for the production of cellular polyurethane plastics using such tertiary amines, have been disclosed, for example, in French Pat. No. 1,426,198 and in German Auslegeschrift 1,030,558. When producing foams, using heretofore known tertiary amine catalysts, it has been found, however, that the starting and rising times of the foams are often not satisfactory for production technology. This is also true particularly when foaming is carried out in a mold such as in a process-ing method which is adapted for the production of moldings of specific dimensions for special purposes, such as, for example, for the production of car seats. Furthermore, it has sometimes been very difficult when using the conventional catalyst systems to satisfy the stringent requirements of a particular industry, for example, the motor car industry, for the extremely small reduction in hardness following permanent compression. This is particularly difficult since foam moldings which have the necessary high permeability to air are difficult to obtain using the heretofore known catalyst systems. This extremely high permeability to air, however, is a necessary condition for meeting the hereinabove set forth requirement.

It is, therefore, an object of this invention to provide tertiary amines useful as catalysts in the polyurethane forming reaction which are devoid of the foregoing disadvantages and problems. Another object of this invention is to provide tertiary amine catalysts which provide satisfactory starting and rising times in the polyurethane forming reaction. A further object of this invention is to provide tertiary amine catalysts which attenuate cross-linking catalysis of organo-metallic catalysts in the polyurethane foam forming reaction. Still another object of this invention is to provide a catalyzed polyurethane foam forming reaction wherein the reaction produces foams without a tendency to tear as the air permeability of the foam is increased. Yet another object of this invention is to provide a catalyzed polyurethane foam forming reaction wherein the tendency of foam to shrink is reduced. A still further additional object of this invention is to provide tertiary amine catalysts useful in the polyurethane forming reaction whereby use of the active polyols containing primary hydroxyl groups in the molecule is greatly enhanced. Another object of this invention is to provide a process for producing such tertiary amine catalysts.

The foregoing objects and others which will become apparent from the following description are accomplished in accordance with this invention, generally speaking, by providing aminoether compounds having the formula

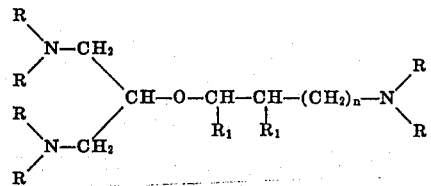

wherein $n$ is 0 or 1 and the R substituents, which may be the same or different, represent methyl or ethyl radicals, the $R_1$ substituents representing hydrogen atoms or a hydrogen atom and a methyl, ethyl or

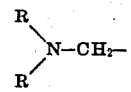

radical in cases where $n$ is 0 but only hydrogen atoms in cases where n is 1.

Additionally, the objects of this invention are accomplished by providing a catalyzed process for producing cellular polyurethanes by the reaction of compounds with active hydrogen atoms reactive with —NCO groups and organic polyisocyanates wherein the catalysts employed are compounds having the hereinabove set forth formula.

The new class of compounds has been found to have surprisingly proved to be highly effective catalysts for the production of polyurethanes, in particular of polyurethane foams from compounds with active hydrogen atoms reactive with —NCO groups and polyisocyanates. The aminoether compounds of this invention have the advantage of altering the reaction times and, in particular, not only the starting time but also the rising time and the setting time in a manner that is very desirable in polyurethane production. Thus, the reaction time can be adjusted, as required, for the particular application, by a suitable choice of the quantity or types of compounds when using these catalysts. One particular advantage is that the organo-metallic compounds, which, in particular, catalyze the cross-linking reaction in the foam, appear to have a suitably attenuated effect. Hence it is possible to extend the range of application of the organo-metallic compounds without the foams showing an increasing tendency to tear as the air permeability is increased from the normal value to the extremely high value required. Furthermore, the tendency to shrink is reduced. From the point of view of processing technique, the manufacturer of polyurethane foam moldings can now shorten the hardening times, or, when a subsequent tempering of the moldings is required, reduce the tempering time or temperature. Foam plastics with a desired open pore structure can now be produced even using the active polyols, that is, polyols which contain an increased proportion of primary hydroxyl groups in the molecule.

This invention thus relates to compounds having the formula

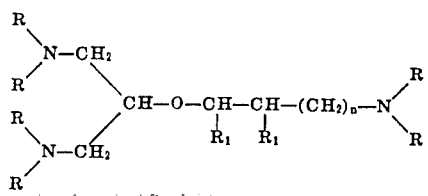

wherein n is 0 or 1 and the R substituents, which may be the same or different, represent methyl or ethyl radicals, the $R_1$ substituents representing hydrogen atoms or a hydrogen atom and a methyl, ethyl of

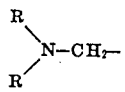

radical in cases where n is 0 but only hydrogen atoms in cases where n is 1.

The following formulas represent examples of compounds that fall within the scope of the invention:

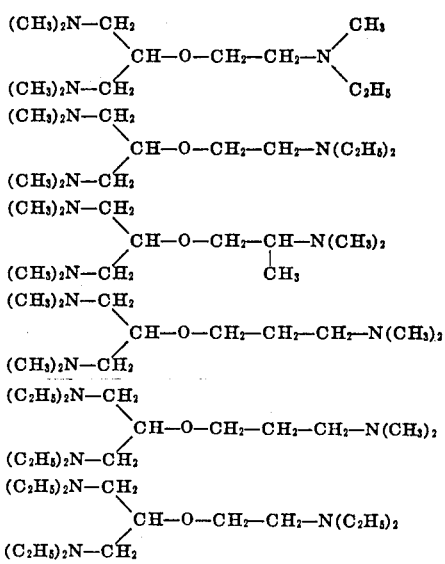

Compounds of the following formulas are especially suitable for use in the process of the invention:

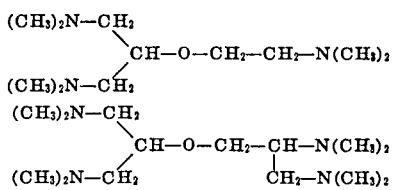

and/or

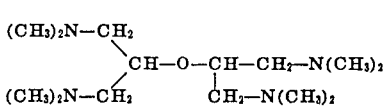

Compounds of this type can be prepared by various methods, for example, hydroxylamines having the formula

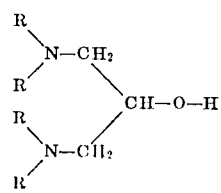

wherein R has the meaning set forth hereinabove, may be reacted in the form of their metal alcoholates, preferably alkali metal alcoholates, with dialkylaminoalkyl halides or bis-(dialkylaminoalkyl)-halides having the formula

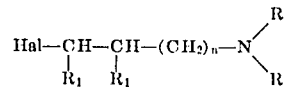

wherein n, R and $R_1$ have the meanings set forth hereinabove. In the reaction, metal halides are split off. In addition, compounds having the formula

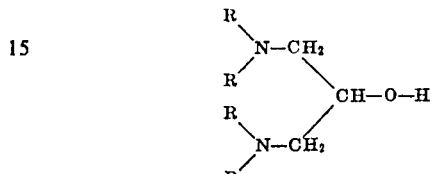

wherein R has the meaning set forth hereinabove, may first be reacted with acrylonitrile to form aminonitriles having the formula

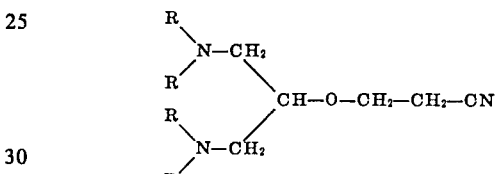

which aminonitriles are then hydrogenated according to generally known hydrogenation procedures to give primary-tertiary amines having the formula

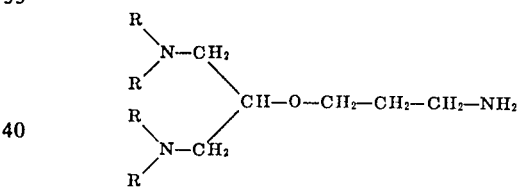

which primary-tertiary amines are then methylated or ethylated according to generally known alkylation processes.

This invention also provides a process for the preparation of compounds having the formula

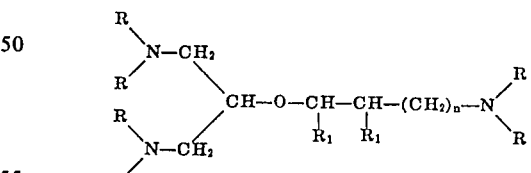

wherein the substituents R and $R_1$ have the meanings set forth hereinabove, in which process compounds having the formula

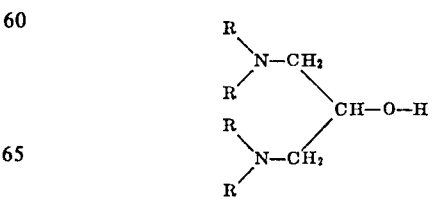

wherein the R substituents have the meaning set forth hereinabove, are reacted in the form of their metal alcoholates with a dialkylaminoalkyl halide or a bis-(dialkylamino)-alkyl halide. In addition, compounds having the formula:

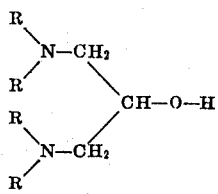

wherein the R substituents have the meaning set forth hereinabove, are reacted with acrylonitrile and the resulting adduct having the formula

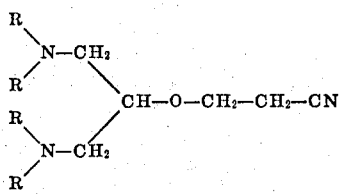

wherein the substituents R have the meaning set forth hereinabove, are hydrogenated according to generally known methods to the corresponding amino compound which is then methylated or ethylated in a generally known manner.

Preparation of the compounds of this invention may be carried out, for example, by converting an amino alcohol having the formula

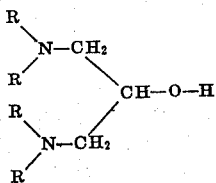

wherein R has the meaning set forth hereinabove, into the corresponding alkali metal alcoholate by heating it with an alkali metal in an anhydrous solvent such as benzene, toluene, xylene or the like. Alternatively, this can be done by heating it with an alkali metal hydroxide with continuous removal of the water formed in the reaction, such as, for example, azeotropically. The solution of the alkali metal alcoholate in an anhydrous solvent, such as toluene, is dissolved, for example, at the boiling point, with a dialkylaminoalkyl halide, for example, of the formula:

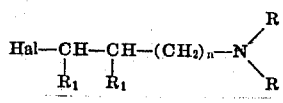

wherein $n$, R and $R_1$ have the meanings set forth hereinabove. This can be accomplished, if desired, in solution, or alternatively, with the hydrogen halide. The compounds of this invention are formed with the elimination of alkali metal halide, and they are subsequently isolated in any suitable known manner, such as, for example, by distillation. If the compounds of this invention are produced with acrylonitrile, the process is carried out in the presence of an alkali metal catalyst, for example, an alkali metal alcoholate which may be produced, for example, by dissolving small quantities of sodium metal in the reaction medium, and hydrogenation of the adduct is carried out in a generally known manner, preferably in the presence of a Raney nickel or Raney cobalt catalyst and with the addition of ammonia. Methylation or ethylation of the primary amino group formed by hydrogenation is preferably carried out by catalytic reduction using formaldehyde or acetaldehyde and hydrogen in a generally known manner.

As already indicated, the compounds of this invention are highly active catalysts for the production of polyurethanes, especially polyurethane foams. The starting materials for the production of polyurethane resins or foams are compounds which contain active hydrogen atoms reactive with —NCO groups and polyisocyanates as set forth hereinafter.

This invention thus also relates to a process for the production of synthetic resins which contain urethane groups from compounds which contain active hydrogen atoms reactive with —NCO groups, organic polyisocyanates, catalysts and, if desired, other additives wherein the catalysts used are compounds having the formula

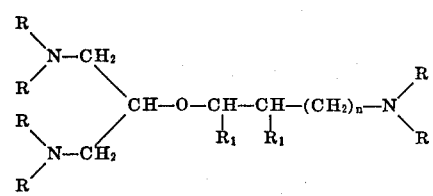

wherein $n$ is 0 or 1 and the R substituents, which are the same or different, represent methyl or ethyl radicals, the $R_1$ substituents represent hydrogen atoms or a hydrogen atom and a methyl, ethyl or

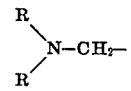

group in cases where $n$ is 0 but only hydrogen atoms in cases where $n$ is 1.

This invention thus also relates in particular to a process for the production of foam plastics which contain urethane groups from compounds which have active hydrogen atoms reactive with —NCO groups, organic polyisocyanates, blowing agents and/or water, catalysts and, if desired, other additives, wherein the catalysts used are compounds having the formula

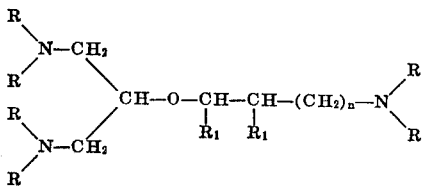

wherein $n$ is 0 or 1 and the R substituents, which may be the same or different, represent methyl or ethyl radicals, and the $R_1$ substituents represent hydrogen atoms or a hydrogen atom and a methyl, ethyl or

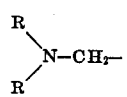

group in cases where $n$ is 0 but only hydrogen atoms in cases where $n$ is 1.

Suitable compounds for the preparation of polyurethanes according to the invention are those which have active hydrogen atoms as determined by the Zerewitinoff method. Generally speaking, any compound having such an active hydrogen atom may be used. In particular, higher molecular weight polyethers, polyesters, polyester amides, polythioethers, polyacetals, polycarbonates and the like, as disclosed, for example, in Kunststoffhandbuch, Volume VII, Vieweg-Hochtlen, Publishers Carl Hanser Verlag, Munich, 1966, pages 45–71, may be used. The higher molecular weight compounds with reactive hydrogen atoms will have a molecular weight that can vary over a wide range and will generally have a molecular weight of from 500 to 10,000 and are preferably polyhydroxyl compounds.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha-beta-diethylsuccinic acid, isophthalic acid, terephthalic acid, hemimellitic acid, trimellitic acid, trimesic acid, mellophanic acid, prehnitic acid, pyromellitic acid, benzene-pentacarboxylic acid and the like. Any suitable polyhydric alcohol may be used such as, for example, ethylene glycol, 1,3-propylene glycol, 1,2-butylene glycol, 1,2-propylene glycol, 1,4-butylene glycol, 1,3-butylene glycol, 1,5-pentane diol, 1,4-pentane diol, 1,3-pentane diol, 1,6-hexane diol, 1,7-heptane diol, glycerine, trimethylol propane, 1,3,6-hexanetriol, triethanolamine, pentaerythritol, sorbitol and the like.

Any suitable polyhydric polyalkylene ether may be used such as, for example, the condensation product of an alkylene oxide beginning with any suitable initiator. The initiator may be a difunctional compound including water so that the resulting polyether is essentially a chain of repeating alkylene oxy groups as in polyethylene ether glycol, polypropylene ether glycol, polybutylene ether glycol and the like; or the initiator may be any suitable active hydrogen containing compound which may be a monomer or even a compound having a relatively high molecular weight including other active hydrogen containing compounds as disclosed herein. It is preferred that the initiator have from two to eight active sites to which the alkylene oxides may add, including, for example, amines, alcohols and the like. Any suitable alkylene oxide may be used such as, for example, ethylene oxide, propylene oxide, butylene oxide, amylene oxide, tetrahydrofuran, epihalohydrins such as epichlorohydrin, styrene oxide and the like. Any suitable initiator may be used including, for example, water, polyhydric alcohols, preferably having two to eight hydroxyl groups, amines, preferably having two to eight replaceable hydrogen atoms bonded to nitrogen atoms. Phosphorous acids may also be used, but the phosphorous compounds are somewhat peculiar in that a different mode of preparation may be required, as more particularly set forth below. The resulting polyhydric polyalkylene ethers with the various bases of nitrogen, phosphorous and the like may have either primary or secondary hydroxyl groups or mixtures of primary and secondary hydroxyl groups. It is preferred to use alkylene oxides which contain from two to five carbon atoms and, generally speaking, it is advantageous to condense from about 5 to about 30 mols of alkylene oxide per functional group of the initiator. There are many desirable processes for the preparation of polyhydric polyalkylene ethers including U.S. Pat. Nos. 1,922,459, 3,009,939 and 3,061,625 or by the process disclosed by Wurtz in 1859 and in Encyclopedia of Chemical Technology, Volume 7, Pages 257 to 262, published by Interscience Publishers, Inc. (1951).

Specific examples of initiators are water, ethylene glycol, propylene glycol, glycerine, trimethylol propane, pentaerythritol, arbitol, sorbitol, maltose, sucrose, ammonia, diethanolamine, triethanolamine, dipropanolamine, tripropanolamine, diethanolpropanolamine, tributanolamine, 2,4-tolylene diamine, 4,4'-diphenylmethane diamine, p, p', p''-triphenylmethane triamine, ethylene diamine, propylene diamine, propylene triamine, N,N,N',N'-tetrakis-(2-hydroxypropyl) ethylene diamine, diethylene triamine. The phosphorous containing polyols are more fully described below.

The polyethers used may, for example, be pure difunctional or polyfunctional polypropylene glycols, but polypropylene glycols which have been modified with ethylene oxide in a generally known manner may also be used. Furthermore, the compounds according to the invention have a catalytic effect both with polyethers in which the terminal secondary hydroxyl groups have been converted into primary hydroxyl groups by the addition of ethylene oxide and with polyethers in which the modification with ethylene oxide has been achieved in any desired manner by block polymerization or copolymerization within the chain. The same applies to polyethers which have been modified with ethylene oxide or other epoxides both within the chain and at the ends of the chain.

Any suitable polyhydric polythioether may be used such as, for example, the condensation product of thiodiglycol or the reaction product of a polyhydric alcohol such as is disclosed above for the preparation of the hydroxyl polyesters with any other suitable thioetherglycol. Other suitable polyhydric polythioethers are disclosed in U.S. Pat. Nos. 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a polyhydric alcohol such as those disclosed above for use in the preparation of the hydroxyl polyesters.

Suitable compounds which contain active hydrogen atoms also include low molecular weight compounds which generally have molecular weights of up to 500, such as, for example, low molecular weight polyols, amino alcohols, thiols, amines and the like, which compounds may be used either alone or, preferably, in admixture with the high molecular weight compounds which contain reactive hydrogen atoms. As examples of suitable polyols that may be used there may be mentioned, for example, alkane diols such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexane diol, 1,7-heptane diol, 2,2-dimethyl-1,3-propane diol, 1,8-octane diol and the like including 1,20-eicosane diol and the like; alkene diols such as, for example, 1-butene-1,4-diol, 1,3-butadiene-1,4-diol, 2-pentene-1,5-diol, 2-hexene-1,6-diol, 2-heptene-1,7-diol and the like; alkyne diols such as, for example, 2-butyne-1,4-diol, 1,5-hexadiyne-1,6-diol and the like; alkane triols such as, for example, glycerol, trimethylolpropane, 1,3,6-hexanetriol, 1,3,7-heptane triol, 1,4,8-octane triol, 1,6,12-dodecane triol and the like; alkene triol such as 1-hexene-1,3,6-triol and the like; alkyne triols such as 2-hexyne-1,3,6-triol and the like; alkyne triols such as 2-hexyne-1,3,6-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any suitable aliphatic thiol including alkane thiols containing two or more -SH groups may be used such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like.

Any suitable polyamine may be used including, for example, aromatic polyamines such as, for example, p-amino aniline, 1,5-diamino naphthalene, 2,4-diamino toluylene, 1,3,5-benzene triamine, 1,2,3-benzene triamine, 1,4,5,8-naphthalene tetramine and the like; aliphatic polyamines such as, for example, ethylene diamine, 1,3-propylene diamine, 1,4-butylene diamine, hexamethylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridene, 2,4-diamino-2-aminomethyl pyrimidine, 2,5-diamino-1,3,4-thiodiazol and the like.

Any suitable organic polyisocyanates may be used as a starting material according to this invention such as, for example, those mentioned in Kunststoffhandbuch, Volume VII, Vieweg-Hochtlen, Publishers Carl Hanser Verlag, Munich, 1966, on pages 76–94 and in French Pat. No. 1,426,198.

Any suitable organic polyisocyanate may be used in the process of the present invention including aromatic, aliphatic and heterocyclic polyisocyanates. In other words, two or more isocyanate radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are therefore ethylene diisocyanate, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, p,p',p''-triphenyl methane triisocyanate, 1,5-naphthalene diisocyanate, furfurylidene diisocyanate or polyisocyanates in a blocked or inactive form such as the bis-phenyl carbamates of 2,4- or 2,6-toluylene diisocyanate, p,p'-diphenylmethane diisocyanate, p-phenylene diisocyanate, 1,5-naphthalene diisocyanate and the like. Additional examples are the urea polyisocyanates such as are obtained by reacting 2 mols of toluylene diisocyanate with 1 mol of water as disclosed, for example, in U.S. Pat. No. 2,757,185. The isocyanates may be used in refined or crude form such as crude toluylene diisocyanates as are obtained by the phosgenation of a mixture of toluylene diamines or crude diphenyl methane isocyanates such as those obtained by the phosgenation of crude diphenyl methane diamine.

Toluylene-2,4- and -2,6-diisocyanates and their isomeric mixtures, especially a mixture of 80 percent 2,4-toluylene diisocyanate and 20 percent 2,6-toluylene diisocyanate and polyphenyl polymethylene polyisocyanates obtained by aniline/formaldehyde condensation followed by phosgenation and mixtures of these polyisocyanates with the above-mentioned toluylene diisocyanates are preferred. Diphenylmethane diisocyanates which contain carbodiimide groups, such as are prepared, for example, according to German Pat. No. 1,092,007, are also preferred for use in the invention. The so-called prepolymers which are reaction products of the above-mentioned compounds containing reactive hydrogen atoms with polyisocyanates are also suitable starting materials for the production of polyurethanes in the process according to this invention. These prepolymers can be either the isocyanate prepolymers or hydroxyl prepolymers.

Blowing agents and/or water are used for the production of foams with the blowing agents generally being fluorinated hydrocarbons, such as monofluorotrichloromethane or difluorodichloromethane and the like. But, methylene chloride or other low boiling solvents, such as acetone and the like may also be used.

It is often advantageous in the production of cellular polyurethane plastics to include other additives in the reaction mixture such as, for example, emulsifiers, foam stabilizers, dyes, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Pat. No. 2,834,748. Where polyhydric polyalkylene ethers are included in the reaction mixture to prepare a cellular polyurethane plastic, it is preferred to employ a silicone oil of the above patent within the scope of the formula:

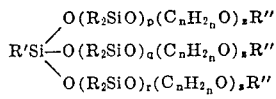

wherein R, R′ and R″ are alkyl radicals having one to four carbon atoms: $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. A preferred compound has the formula:

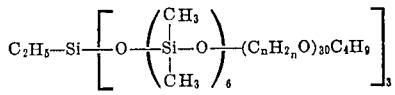

wherein $(C_nH_{2n}O)$ is a mixed polyoxyethylene and oxypropylene block copolymer containing about 17 oxyethylene units and about 13 oxypropylene units. Other suitable stabilizers are disclosed in Canadian Pat. Nos. 668,478, 668,537 and 670,091. Other suitable compounds may, therefore, have the formula

where X is an integer and represents the number of trifunctional silicone atoms bonded to a single monovalent or polyvalent hydrocarbon radical, R′; R is a monovalent hydrocarbon group as defined above; $a$ is an integer having a value of at least 1 and represents the number of polyoxyalkylene chains in the block copolymer; $y$ is an integer having a value of at least 3 and denotes the number of difunctional siloxane units, $n$ is an integer from 2 to 4 denoting the number of carbon atoms in the oxyalkylene groups; and $z$ is an integer having a value of at least 5 and denotes the length of the oxyalkylene chain. It will be understood further that such compositions of matter are mixtures of such block copolymers wherein $y$ and $z$ are of different values and that method of determining the chain length of the polysiloxane chains and the polyoxyalkylene chains give values which represent average chain lengths. In the above formula, R represents monovalent hydrocarbon radicals, such as alkyl, aryl or aralkyl radicals, the polyoxyalkylene chain terminates with a hydrogen atom, R‴ is an alkyl radical or a trihydrocarbonsilyl radical having the formula $R_3Si—$ where R is a monovalent hydrocarbon radical and terminates a siloxane chain, and R′ represents a monovalent or polyvalent hydrocarbon radical, being monovalent when $x$ is 1, divalent when $x$ is 2, trivalent when $x$ is 3, tetravalent when $x$ is 4.

One type of block copolymer is represented when $x$ in the above formula is one, and in this instance a branched chain formula may be postulated as follows:

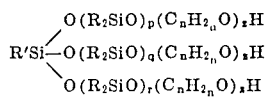

where $p+q+r = y$ of the above formula and has a minimum value of 3, the other subscripts being the same as in the foregoing formula. In this instance all three of the oxyalkylene chains are joined to the end of polysiloxane chains of the type $—(R_2SiO)—$. Specifically, one could use

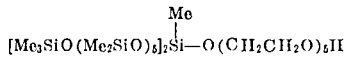

The compounds of this invention are used as catalysts for the production of polyurethanes, in particular polyurethane foams, and they are generally used in any suitable catalytic quantities, generally of from about 0.01 to about 2.0 percent by weight, based on the polyhydroxyl compound.

The catalyst compounds of this invention may also be used in combination with previously known catalysts, especially organometallic compounds, and in particular, organo tin compounds such as, for example, tin(II) octoate, stannous oleate, dibutyl tin dilaurate, dibutyl-tin-(2-ethyl hexoate), lead naphthenate and the like, such as, for example, those disclosed in U.S. Pat. No. 3,136,731. According to one preferred embodiment, the compounds of this invention are used in combination with silylamines, such as, for example, those mentioned in German Auslegeschriften 1,229,290 and 1,239,468.

The catalysts of this invention, either alone or in combination with the conventional catalysts mentioned above, are particularly suitable for activating systems which produce foam by the block foaming process. This method of producing foams differs from foaming in the mold in that the reaction mixture is applied as a continuous stream to conveyor bands where it foams up. Blocks of foam can be produced continuously by this method. The raw materials used for the block foaming process do not necessarily differ substantially from those used for foaming in the mold. In such systems, the catalysts of this invention surprisingly show considerable technological advantages over conventional catalysts. Their activation has a particularly marked effect on the starting time (cream time), and thus also advantageously influences both the rising time and the setting time. The starting time is defined in polyurethane chemistry as the time in seconds which the foamable mixed system requires for conversion from the liquid state into a creamy, slightly more viscous state. This reaction time depends to a large extent on the quantity of water used in the recipe and is particularly long if foams of high bulk density are to be produced which only contain a small amount of water in the recipe.

The additional or exclusive use of the catalyst compounds of this invention in the conventional formulations substantially alters the reactivity of the foamable mixture with regards to the starting reaction time. That is, the reaction time is considerably shortened. This constitutes a very important technological advance in polyurethane foam production since shortening this reaction time also allows the reaction path on the continuously moving conveyor band to be shortened. That is, the amount of space required for the reaction path is greatly reduced. The catalysts of this invention, therefore, also make it possible to produce foams on machines which have only a very short conveyor band or only very short side walls. It has previously been very difficult or even impossible to produce foams of high bulk density on such machines with sufficient reliability. Advantages are also obtained using the process of this invention on machines equipped with a normal conveyor band. The reduction both in time and reaction path length enables the conveyor band to be guided securely. This shortening of the reaction path length also makes it possible to transport more rapidly the block which is in the process of foaming up. Alternatively, and this is an especially important aspect of the invention, the rate of polyol output can be increased for a given velocity of the conveyor band. This increased polyol output in turn enables the manufacturer of foams to produce higher foam blocks and, therefore, to operate more economically.

Thus, for example, when using a mixture of about 90 parts by weight of 1,3-bis-dimethylamino-2-(2-dimethylamino-ethoxy)-propane and about 10 parts by weight of a silamorpholine under normal conditions suitable for production of polyurethane foams, the output of a polyether polyol of OH number 49, molecular weight 3,500, can be increased from 53 kg/min to 87 kg/min. In this foaming process, about 2.4 parts of water were used for 100 parts of the polyether polyol. When using the heretofore known ordinary commercial catalysts it has previously not been possible to increase the polyol output above 53 kg/min when the conveyor band was only 9 m long and the side walls only 8 m long because the velocity of the conveyor band then had to be increased so much on account of the long reaction path that the foam block was not sufficiently hardened on leaving the side walls and flowed out sideways.

The use of only 0.05 part by weight of the above-described combination of catalysts according to the process of this invention, that is, of 1,3-bis-dimethylamino-2-(2-dimethylamino-ethoxy) -propane and a silamorpholine, preferably 2,2,4-trimethyl-2-silamorpholine, in addition to conventional catalysts, enabled the reaction path to be shortened by almost 1 m under the above-mentioned conditions so that production could be carried out with increased polyol output. The resulting foam blocks have a crude bulk density of from 39 to 40 kg/m$^3$ and are 9 cm higher when produced by the process of this invention. It has also been found that if the reaction path is not increased and the polyol output therefore the same, that is, at 87 kg/min, the amount of conventional commercial catalysts used can be easily reduced by about 30 percent.

The polyurethane products of the process of this invention may be homogeneous or cellular polyurethanes. The homogeneous polyurethanes are mainly elastomer products which can be produced by any of the suitable known processes, such as, for example, by the casting process, the thermoplastic process or by processes conventionally used in the rubber industry. The cellular polyurethanes which can be produced using the compounds of this invention as catalysts may be soft, semihard or hard and, as already indicated, can be produced, for example, by foaming in the mold or by block foaming. Polyurethane moldings which have a compact surface and cellular core can also be produced suing the compounds of this invention as catalysts.

The polyurethanes obtained using the compounds of this invention as catalysts have a wide range of application, such as, for example, as sealing materials, drive belts and gear wheels, linings or couplings and sole material for shoes, and the cellular polyurethanes may be used as heat and cold insulating material and upholstery material.

The invention is further illustrated but is not intended to be limited by the following examples in which all parts and percentages are by weight unless otherwise specified.

EXAMPLE 1

1,3-bis-dimethylamino-2-(3-dimethylamino-propyloxy)-propane

About 1.0 parts of sodium is added to about 730 parts (about 5 mol) of 1,3-bis-dimethylamino-2-hydroxypropane and the mixture is heated to about 40°C. When the sodium has gone into solution, about 292 parts (about 5.5 mol) of acrylonitrile are added dropwise in the course of one hour, the temperature being kept at about 40°C. After the addition of about 5 parts by volume of concentrated hydrochloric acid, the unreacted acrylonitrile is distilled off and the residue is fractionated in vacuo. About 120 parts of unchanged starting material distil over at 74°C/13 mm Hg, and after an intermediate fraction of about 6 parts, 745 parts of 1,3-bis-dimethyl-amino-2-(2-cyanoethoxy)-propane of boiling point 90°C/0.1 mm Hg are obtained. The yield, based on unreacted 1,3-bis-dimethylamino-2-hydroxypropane, amounts to about 89.5 percent of the theory.

A mixture of about 597 parts (about 3 mol) of 1,3-bis-dimethylamino-2-(2-cyanoethoxy)-propane, about 300 parts by volume of tetrahydrofuran and about 400 parts by volume of liquid ammonia is hydrogenated in the presence of about 30 parts of Raney cobalt in a 3 liter autoclave equipped with stirrer at a temperature of about 80°C. and a hydrogen pressure of about 100 to 150 atmospheres. The calculated quantity of hydrogen is taken up in about one hour. The solvent and ammonia are distilled from the solution from which the catalyst has been filtered off.

The residue consisting mainly of 1,3-bis-dimethylamino-2-(3-amino-propyloxy)-propane is heated in an autoclave equipped with stirrer at about 80°C. to 85°C. under a hydrogen pressure of about 150 atmospheres, after the addition of about 30 parts of Raney nickel. About a 30 percent aqueous formaldehyde solution is introduced into the autoclave at the rate of about 10 parts/min by means of a dosing pump, and after the pressure has dropped to about 100 atmospheres, the hydrogen taken up is continuously replaced. When there is no further pressure drop, the supply of formaldehyde is stopped. The amount pumped in is about 650 parts of the 30 percent solution. The cooled contents of the autoclave, freed from catalyst, is mixed with about 200 parts of sodium hydroxide with stirring, and the organic layer which then separates is fractionated in vacuo. About 610 parts of 1,3-bis-dimethylamino-2-(3-dimethylamino-propyloxy)-propane of boiling point 123°C/13 mm Hg are obtained. The yield, based on the amount of 1,3 - bis-(dimethylamino-2-(2-cyanoethoxy)-propane charged, amounts to about 88 percent of the theory.

EXAMPLE 2

1,3-bis-dimethylamino-2-(2-diethylamino-ethoxy)-propane

About 1,285 parts (about 8.8 mol) of 1,3-bis-dimethylamino-2-hydroxy-propane are carefully added to a mixture of about 184 parts (about 8 gram atoms) of sodium and about 2 liters of absolute toluene. When the temperature ceases to rise, the reaction mixture is heated to boiling until the sodium has gone into solution (time about 45 hours). A solution of about 1,060 parts (about 7.8 mol) of 2-diethylamino-ethyl chloride in about 1.5 liters of toluene is added to the boiling solution of alcoholate within about one hour and the mixture is heated under reflux for about a further 4 hours. After cooling, the precipitated sodium chloride is removed by suction filtration and washed with toluene. The filtrate is distilled over using a 60 cm column, first at about 100 mm Hg to remove toluene and then using the full vacuum produced by a water pump. Unreacted 1,3-bis-dimethylamino-2-hydroxypropane distils over at 74°C/13 mm Hg. After this there is a small intermediate fraction followed by the main fraction of 1,3-bis-dimethylamino2-(2-diethylamino-ethoxy)-propane which has a boiling point of 131°C/13 mm Hg. About 1,585 parts, corresponding to a yield of 83 percent of the theory, are obtained.

EXAMPLE 3

1,3-bis-dimethylamino-2-(2-dimethylamino-ethoxy)-propane

A mixture of about 200 parts (about 5 mol) of sodium hydroxide, about 876 parts (about 6 mol) of 1,3-bis-dimethylamino-2-hydroxypropane and about 900 parts by volume of toluene is heated to boiling using a water separator, and boiling is continued until an aqueous layer of about 90 parts by volume has separated. A suspension of about 346 parts (about 2.4 mol) of 2-dimethylamino-ethyl chloride hydrochloride in about 500 parts by volume of toluene is added in the course of about 1 hour at about 100°C. to 105°C. to the solution of sodium alcoholate formed from 1,3-bis-dimethylamino-2-hydroxypropane. The mixture is then heated to boiling for about 3 hours. Toluene is distilled off at about 100 mm Hg from the solution which has been freed from the precipitated sodium chloride by filtration. Fractionation of the residue yields about 603 parts of 1,3-bis-dimethylamino-2-hydroxypropane of boiling point 74°C/13 mm Hg, about 4 parts of an intermediate fraction and about 335 parts of 1,3-bis-dimethylamino-2-(2-dimethylaminoethoxy)-propane of boiling point 111°C/13 mm Hg. The yield amounts to about 64.2 percent of the theory, based on the amount of 2-dimethylaminoethyl chloride hydrochloride charged, or about 82.5 percent of the theory, based on the amount of 1,3-bis-dimethylamino-2-hydroxypropane reacted.

EXAMPLE 4

1,3-bis-dimethylamino-2-(2,3-bis-dimethylamino-propyloxy)-propane [and bis-($\beta,\beta'$-bis-dimethylamino-isopropyl)-ether]

About 48 parts (about 2.1 gram atoms) of sodium are added to a mixture of about 321 parts (about 2.2 mol) of 1,3-bis-dimethylamino-2-hydroxypropane and 500 parts by volume of absolute toluene, and the reaction mixture is heated to boiling until the sodium has gone into solution. A solution of about 329 parts (about 2 mol) of 1,3-bis-dimethylamino-2-chloropropane in about 400 parts by volume of toluene are then added within one hour and the mixture is heated to boiling for about a further 3 hours. Fractional distillation of the solution from which the precipitated sodium chloride has been filtered off yields about 423 parts of a fraction which boils at 146°C. to 148°C/13 mm Hg, consisting of about 95 percent of 1,3-bis-dimethylamino-2-(2,3-bis-dimethylamino-propyloxy)-propane and about 5 percent of bis-($\beta,\beta'$-bis-dimethylamino-isopropyl)-ether.

EXAMPLES 5 to 10

About 34 parts of a toluylene diisocyanate isomeric mixture consisting of 80 percent of 2,4- and 20 percent of 2,6-toluylene diisocyanate (Examples 5 and 6) or 43 parts of such a toluylene diisocyanate isomeric mixture (Examples 7 and 8) or 49 parts of such a toluylene diisocyanate isomeric mixture (Examples 9 and 10) and the quantities of water, stabilizer and catalyst indicated in Table 1 are added under the conditions found in machine foaming process to about 100 parts of a branched polypropylene-polyethylene oxide-polyether of molecular weight about 3,000 and OH number of about 56 which has partly terminal primary hydroxyl groups. The foams obtained have the mechanical properties set forth in Table 1. The superior catalytic effect of a catalyst of this invention is seen from the rising time and setting time of the resulting foams shown in the Table.

TABLE 1

| Example | 5 | 6 | 7 | 8 | 9 | 10 |
|---|---|---|---|---|---|---|
| Water, parts | 2.3 | 2.3 | 3.4 | 3.4 | 4.0 | 4.0 |
| Water-soluble silicone stabilizer, parts | 1.0 | 1.0 | 1.0 | 1.0 | 1.0 | 0.7 |
| Triethylenediamine, parts | 0.12 | | | | 0.15 | |
| $(CH_3)_2N-CH_2$<br>　　　　　　＼<br>　　　　　　CH-O-CH$_2$-CH$_2$-N(CH$_3$)$_2$, parts<br>　　　　　　／<br>$(CH_3)_2N-CH_2$ | | 0.1 | | 0.1 | | 0.12 |
| $CH_3$　　　　　　　　　　　　　　　　$CH_3$<br>　＼　　　　　　　　　　　　　　　／<br>　　N-CH$_2$-CH$_2$-O-CH$_2$-CH$_2$-N　, parts<br>　／　　　　　　　　　　　　　　　＼<br>$CH_3$　　　　　　　　　　　　　　　　$CH_3$<br>(comparison product) | | | 0.1 | | | |
| Monofluorotrichloromethane, parts | 5.0 | 5.0 | | | | |
| Tin-(II)-octoate, parts | 0.08 | 0.1 | 0.14 | 0.14 | 0.12 | 0.17 |
| Rising time, sec | 130 | 120 | 120 | 100 | 80 | 80 |
| Setting time, sec | 10 | 10 | 20 | 20 | 10 | 20 |

TABLE 1—Continued

| Example | 5 | 6 | 7 | 8 | 9 | 10 |
|---|---|---|---|---|---|---|
| Coefficient | 100 | 100 | 100 | 100 | 100 | 100 |
| Bulk density (kg./m.$^3$) DIN 53,420 | 33 | 33 | 34 | 34 | 29 | 27 |
| Tensile strength (kg./cm.$^2$) DIN 53,572 | 0.8 | 1.0 | 1.1 | 1.4 | 1.1 | 1.2 |
| Elongation at break (percent) DIN 53,572 | 150 | 160 | 160 | 230 | 200 | 280 |
| Compression strength at 40% compression (wt./cm.$^2$) DIN 53,577 | 32 | 27 | 42 | 35 | 33 | 28 |
| Elasticity (percent) | 52 | 52 | 53 | 56 | 51 | 50 |
| Permanent deformation at 90% deformation (percent) DIN 53,572 | 3.7 | 2.6 | 6.8 | 4.7 | 6.0 | 5.9 |
| Compression strength: | | | | | | |
| 25% | 28 | 25 | 34 | 30 | 30 | 26 |
| 50% | 37 | 31 | 45 | 38 | 41 | 28 |
| 65% | 57 | 47 | 73 | 61 | 63 | 45 |
| Hardness loss (percent) according to test ° | 19 | 15 | 20 | 16 | 18 | 16 |
| Permanent deformation (percent) according to test | 2.5 | 2.4 | 4.6 | 4.4 | 6.0 | 5.4 |

° Hardness loss at 50% compression after 250,000 compressions from 50% to 90% of the height of the sample at 3 cycles per second frequency.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention.

What is claimed is:

1. A compound having the formula:

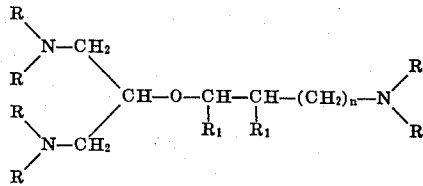

wherein $n$ is 1 or 0 and the R substituents which may be different on opposite sides of the ether linkage are selected from the group consisting of methyl and ethyl and the $R_1$ substituents are hydrogen atoms or a hydrogen atom, methyl, ethyl or

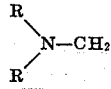

when $n$ is 0 but only hydrogen atoms when n is 1.

2. The compound of claim 1 having the formula

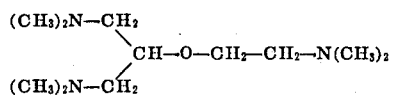

3. The compound of claim 1 having the formula

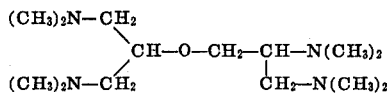

4. The compound of claim 1 having the formula

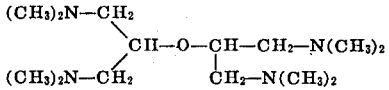

* * * * *

UNITED STATES PATENT OFFICE
CERTIFICATE OF CORRECTION

Patent No. 3,694,510          Dated September 26, 1972

Inventor(s) Friedrich Moller, Gunter Hauptmann, Heinz-Wolfgang Patzelt

It is certified that error appears in the above-identified patent and that said Letters Patent are hereby corrected as shown below:

First page, [30] Foreign Application Priority Data, "Oct. 28, 1968" should be --Oct. 22, 1968--. Column 13, line 66, "suing" should be --using--. Column 14, line 23, after "40°C." insert --by slight cooling. The mixture is then stirred for about 3 hours at about 40°C.--

Title should read --ALIPHATIC POLYAMINOETHER COMPOUNDS--.

Signed and sealed this 25th day of December 1973.

(SEAL)
Attest:

EDWARD M. FLETCHER, JR.          RENE D. TEGTMEYER
Attesting Officer                 Acting Commissioner of Patents